United States Patent [19]

Krueger

[11] 4,274,713
[45] Jun. 23, 1981

[54] DEVICE WITH A SCATTER-FREE LIGHT VALVE

[75] Inventor: Hans Krueger, Munich, Fed. Rep. of Germany

[73] Assignee: Siemens Aktiengesellschaft, Berlin & Munich, Fed. Rep. of Germany

[21] Appl. No.: 928,069

[22] Filed: Jul. 26, 1978

[30] Foreign Application Priority Data

Aug. 4, 1977 [DE] Fed. Rep. of Germany ....... 2735195

[51] Int. Cl.³ .................................................. G02F 1/133
[52] U.S. Cl. ............................. 350/347 R; 350/331 R; 350/349
[58] Field of Search ................. 350/278, 331 R, 334, 350/347 R, 349, 357

[56] References Cited

U.S. PATENT DOCUMENTS

| | | | |
|---|---|---|---|
| 3,694,053 | 9/1972 | Kahn | 350/347 |
| 3,837,730 | 9/1974 | Hatfield et al. | 350/349 |
| 3,912,369 | 10/1975 | Kashnow | 350/347 |
| 3,961,181 | 6/1976 | Golden | 350/331 X |
| 4,025,161 | 5/1977 | La Roche | 350/347 |
| 4,088,392 | 5/1978 | Meyers | 350/357 |
| 4,093,356 | 6/1978 | Bigelow | 350/347 X |

FOREIGN PATENT DOCUMENTS

| | | | |
|---|---|---|---|
| 2158563 | 11/1971 | Fed. Rep. of Germany . | |
| 2416172 | 10/1975 | Fed. Rep. of Germany | 350/278 |
| 2246415 | 11/1976 | Fed. Rep. of Germany . | |
| 2228234 | 11/1974 | France . | |
| 1372868 | 11/1974 | United Kingdom . | |

*Primary Examiner*—Edward S. Bauer
*Attorney, Agent, or Firm*—Hill, Van Santen, Steadman, Chiara & Simpson

[57] ABSTRACT

A device with a scatter-free light valve which may be used as a rear view mirror or a sun visor and is characterized by a pair of carrier plates extending parallel to each other to form a cell having a cavity with transparent conductive coatings facing the cavity which receives a layer that can be switched between different optical states, and a light sensitive element, which is electrically connected to the light valve to constantly change the light transmittance of the light valve in response to the intensity of light radiation sensed by the light sensitive element.

1 Claim, 5 Drawing Figures

DEVICE WITH A SCATTER-FREE LIGHT VALVE

BACKGROUND OF THE INVENTION

1. Field of the Invention

The present invention is directed to a device having a scatter-free light valve comprising a cell having two carrier plates which are arranged in parallel to one another to form a chamber therebetween with the surfaces of the plates facing the chamber being provided with electrically conductive transparent coatings and the chamber receiving a layer of material which can be switched between different optical states.

2. Prior Art

A light valve, which has a pair of carrier plates arranged in parallel to form a chamber for receiving a layer of liquid crystal material with the carrier plate having transparent, electrically conductive coatings, is disclosed in British Pat. No. 1,372,868 which corresponds to German Offenlegungsschrift No. 21 58 563.

In order to prevent the glare of sunlight, various visual aids such as a sun visor have been proposed. However, it would be a considerable improvement for the driver of an automobile if he were able to maintain the field of vision, which he must constantly keep in sight, free of obstructions. Preferably, protection gainst sunlight, which was too intense, was provided by pivotable sun visors or tinted windshields or windscreens and protection against too strong a light, which was being reflected by the rear view mirror, was provided by utilizing a tiltable mirror holder. All of these measures are unsatisfactory insomuch as they do not afford an automatic screening and are effective solely in the case of really disturbing light.

While it has already been suggested to carry out an attenuation of the light on a liquid crystal base as disclosed in German Auslegeschrift No. 22 46 415 and in the French published patent application No. 22 28 234. The aforementioned publications do not discuss the mode of the operation of the liquid crystal, which was being used, in detail but obviously a liquid crystal light valve of a dynamic scattering type was intended. However, above a specific threshold voltage, i.e. when the specific light intensity exceeds a given maximum, a dynamic scattering liquid crystal substance develops a milky cloudiness and in this state will not only prevent the high intensity light, but will also block other images from the operator's view.

SUMMARY OF THE INVENTION

In order to provide a remedy to these problems, the present invention is directed to a device having a light valve which is useful as an optical aid in a motor vehicle such as the rear view mirror or a sun visor and is free from the above mentioned problems.

To accomplish these tasks, the device includes a scatter-free light valve comprising a cell having two carrier plates, which are arranged in parallel to one another to form a chamber therebetween, the surfaces of said plates facing said chamber being provided with electrically conductive, transparent coatings and said chamber receiving a layer of material, which can be switched between different optical states with the improvement comprising said device being used as an optical aid in motor vehicles, said device including a light sensitive element electrically connected to the transparent coatings of the light valves so that the layer of material is constantly changing its light transmittance in response to the intensity of light radiation falling onto the light sensitive element.

The switchable layer of material, which is an anti-dazzle layer, preferably consists of a liquid crystal layer but may consist of a double layer composed of a solid electrolytic layer and an electrochrome layer.

The scatter-free anti-dazzle layer, which functions by means of a gradual, light-flow dependent reduction of its degree of transmission, allows the driver of the vehicle to follow traffic through areas covered by the light valve even when the valve is exerting its anti-dazzle function to a greater or lesser extent. Thus, the driver always remains in control and becomes only relatively and slightly tired even on a long journey due to subjection to high intensity glares.

A light valve, which is suitable for the purposes in question, has previously been considered to be of a low grade. The reason for this is that in liquid crystal layers and electrochrome displays, it is always endeavored to provide the transmission characteristics with a steep as possible side area in order that the representation medium might change its optical state suddenly and in a narrow as possible voltage range. Light valves having a soft optical junction can be produced particularly simply and particularly suitable for this purpose in a so-called "twisted nematic" which has a relatively wide setting angle of the liquid crystal molecules. In order to render the valves even more sensitive to light, one might consider using a bias voltage which is somewhat lower than the threshold voltage. A "zero point shift" of this kind could be carried out, for example, in a series arrangement with a photo-conductor and an AC voltage by a suitable tuning of the liquid crystal resistor, the photo resistor and the voltage of the AC voltage source.

If the light valve provided by the invention is to be incorporated into a rear view mirror, it is advisable to select a construction in which the valve is transparent in the rest state and whose optical characteristics approach those of a circular polarizer with increasing voltage. This is because a circular polarizer located in front of a mirror does not permit the reflected light, whose direction of rotation is of course reversed by the reflections to pass therethrough. A polarizer of this kind can be formed, for example, from a linear polarizer and a λ/4 layer. For example, the reflective layer of the mirror may be arranged with a λ/4 layer and the liquid crystal layer may be embedded therein with a pleochroic dye and be of the type oriented homeotropically while in the rest state and preferably homogeneous with a 90° twist in the direction of a normal to the carrier plate while in the excited state. Thus, the liquid crystal layer in an inactive state is optically inactive but when energized acts like a linear polarizer. In another example of a linear polarizer and a λ/4 layer, a linear polarizer is provided on the surface of the light valve and the liquid crystal material is optically inactive while in the rest state but with the application of an increased voltage approximate the behavior of the λ/4 layer.

In an embodiment of the invention, a rear view mirror having the reflective layer is adjacent one of the carrier plates of the light valve and the liquid crystal layer which is in the chamber of the light valve while in a rest state is a twisted homogeneously and with increased voltages assumes a homeotropic orientation, the device also includes a circular polarizer disposed in front and adjacent the other carrier plate of the cell. Such a construction while exhibiting a blocking action when in the excited state also possesses a surprisingly high degree of transmission in the switched off or rest state. This rest state behavior is probably due to the fact that the stranded liquid crystal layer disturbs the circular polarization of light passing through the light valve in such a manner that a very high proportion thereof can penetrate through the circular polarizer.

In another embodiment of the invention, light valve appears transparent in the switched off state and appears colored in a switched on state. In such a structure, the light crystal layer contains a pleochroic dye and assumes a homeotropical alignment while in the rest state and with increasing voltage assumes a planar cholesterinic orientation.

Generally speaking, the preferred designs are those which allow the passage of light virtually unobstructed in a rest state and thus contain no or only one polarizing foil. In those embodiments which are utilized as sun visors, the liquid crystal layer of the cell may be disposed between a pair of linear polarizers, which are oriented to extend parallel, so that while the liquid crystal layer is in a rest state which has a homeotropic alignment, light passes therethrough. However, in an excited state, the cell assumes a twisted homogeneous orientation which causes a blockage of the light. In another such embodiment, the two linear polarizers are arranged in an intersecting manner with the direction of polarization of one polarizer extending perpendicular to the other and the liquid crystal cell while in a rest state has a twisted homogeneous alignment which is shifted to a homeotropic orientation when an increased voltage is applied thereto.

If desired, the sun visor may utilize a liquid crystal layer which contains a pleochroic dye. In one embodiment, the cell forming the sun visor has a linear polarizer and the liquid crystal layer with the pleochroic dye is homeotropically aligned while in the rest state. With the application of an increased voltage, the molecules of the liquid crystal layer assumes a twisted homogeneous orientation so that with the increased voltage from the light sensitive element, the light valve changes to a light blocking condition. In another embodiment, the liquid crystal layer while in the rest condition has a planar cholesterinic orientation but with increasing voltage adopts a nematic homeotropic state.

DESCRIPTION OF THE PREFERRED EMBODIMENTS

Figure 1:
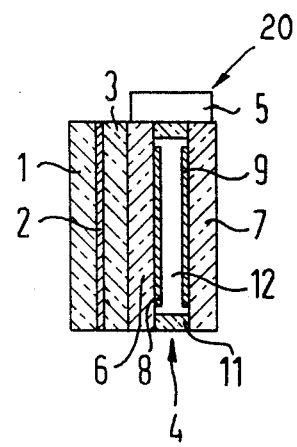
FIG. 1 is a schematic cross-sectional view of a device in accordance with the present invention utilized as a rear view mirror.

The principles of the present invention are particularly useful in a device generally indicated at 20 in FIG. 1 and the device is utilized as a rear view mirror. The device 20 contains a glass substrate 1 having a reflective layer 2, which is covered by a quarter wave plate or $\lambda/4$ layer 3. A liquid crystal cell 4 is disposed on the $\lambda/4$ layer 3 and supports a photosensitive element 5. The liquid crystal cell consists in detail of two transparent carrier plates 6 and 7, which are parallel to one another and spaced apart by a frame 11 to form a chamber for receiving the layer 12 of liquid crystal material. Each of the carrier plates 6 and 7 on the surfaces facing each other and the chamber are provided with transparent, conductive coatings or electrodes 8 and 9, respectively.

In the present embodiment, the liquid crystal substance has a negative, dielectric anisotropy and is also provided with a pleochroic dye. The liquid crystal molecules are oriented at right angles to the plate and thus have a homeotropic orientation while in the rest state, and the molecules are more or less oriented parallel with the plate a homogeneous orientation while in the excited state with the amount of orientation being in response to the amount of voltage which is applied to the electrodes 8 and 9. The homogeneous aligned molecules are preferably also twisted by an angle of 90° in the direction to the normal of the plate. In order to allow a transition into the "twisted homogeneous" state, the molecules are slightly tilted in a suitable manner while in the homeotropic or rest state.

Figure 2:
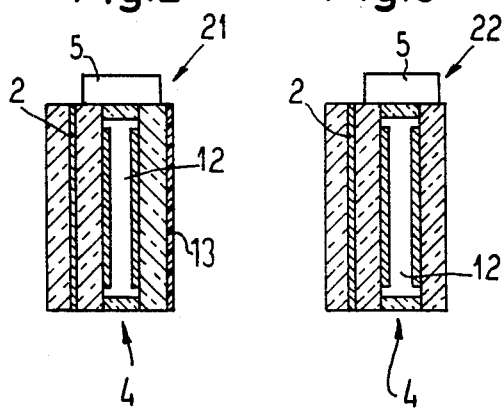
FIG. 2 is a schematic cross-sectional view of an embodiment of a rear view mirror in accordance with the present invention.

In the embodiment of the invention generally indicated at 21 in FIG. 2, the liquid crystal cell 4 is interposed between the reflective layer 2 and a linear polarizer 13. The liquid crystal layer 12 of the cell 4 is of the type which is optically inactive while in a rest state, but its optical behavior approaches that of a quarter wave plate or a $\lambda/4$ layer with an application of an increasing voltage.

Figure 3:
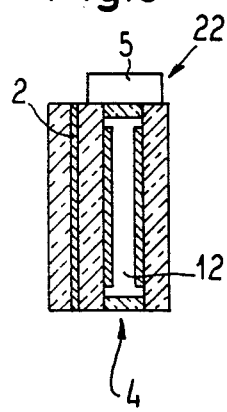
FIG. 3 is another schematic cross-sectional view of a rear view mirror in accordance with the present invention.

In the embodiment of the device generally indicated at 22 in FIG. 3, the polarizing foils are not required. In this embodiment, the reflective liquid crystal cell is arranged in front of the reflective layer 2 and contains a liquid crystal layer 12 which is homeotropically oriented in the rest state and which is provided with embedded pleochroic dye. With an increasing voltage, this layer is gradually transformed into a planar cholesterinic state in which it absorbs more or less great wavelength proportions of the incoming light with the amount of absorption being dependent upon the selection of the dye additive.

Figure 4:
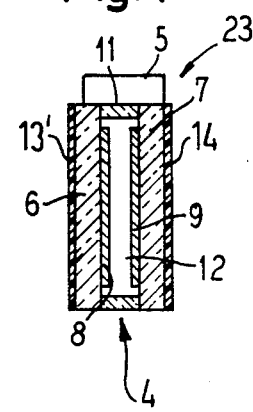
FIG. 4 is a schematic cross-sectional view of an embodiment of the present invention utilized as a sun visor.

As illustrated in FIG. 4, an embodiment of the device is generally indicated at 23 and acts as a sun visor or shade. This visor or shade has the following construction. Between two parallel linear polarizers 13' and 14 is arranged a liquid crystal cell 4 having a pair of carrier plates 6 and 7, which on their sides facing towards one another are provided with transparent electrical coatings 8 and 9 which form electrodes. To space the two plates 6 and 7 apart the desired distance a frame 11 is provided to form a chamber for receiving a liquid crystal layer 12 on which the electrodes 8 and 9 operate. The layer of liquid crystal material 12 has a negative, dielectric anisotropy. The liquid crystal layer corresponds in its orientation and its optical behavior to the liquid crystal layer of the first exemplary embodiment of FIG. 1. One of the polarizers can be emitted if a suitable pleochroic dye is incorporated into the liquid crystal layer.

Thus, when a light sensitive element 5 receives light, it controls or increases the application of a voltage to the electrodes 8 and 9 to change the optical characteristics of the layer 12.

Figure 5:
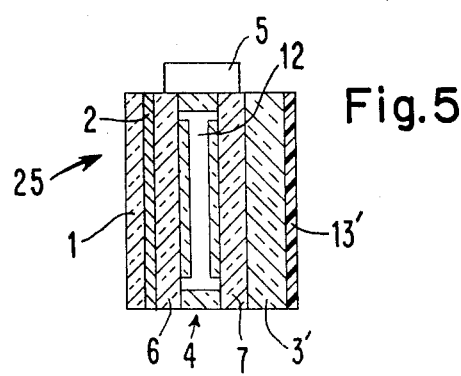
FIG. 5 is a schematic cross-sectional view of another embodiment of the rear view mirror in accordance with the present invention.

As illustrated in FIG. 5, a rear view mirror is generally indicated at 25 and has a reflective mirror layer 2 in direct contact with a transparent carrier plate 6 of the liquid crystal cell of light valve 4, which has a layer 12 and a plate 7. A circular polarizer, which is formed by a linear polarizer 13' and a λ/4 plate layer or plate 3', is disposed in front of the other carrier plate 7 so that light entering the cell will be circularly polarized. While in a rest state, the liquid crystal layer has a twisted homeogeneously orientation and with increasing voltages assumes a homeotropic orientation. A light sensitive element 5 is electrically connected to the transparent coatings of the light valve so that liquid crystal layer 12 is constantly changing its light transmittance in response to the intensity of the light radiation falling onto the light sensitive element.

In addition to the above embodiments for use of the device, reference is made to the German Offenlegungsschrift No. 22 46 415 for additional production and operating details.

The invention should not be limited to the illustrated and illustrative embodiments of the field effect liquid crystal valve. Thus, technical experts are at liberty to combine the details from different embodiments and particularly the relevant orientation, dielectric anisotropy and dye additives in different ways. Additional combination possibilities can be achieved, if it is born in mind that the pleochroic dyes are available which are absorbent when they extend in the direction of propagation of the light and allow the light to pass through unobstructed when extending transverse to this direction.

Although various minor modifications may be suggested by those versed in the art, it should be understood that I wish to embody within the scope of the patent warranted hereon, all such modifications as reasonably and properly come within the scope of my contribution to the art.

I claim:

1. In a device including a scatter-free light valve comprising a cell having two carrier plates which are arranged in parallel to one another to form a chamber therebetween, the surfaces of said plates facing said chamber being provided with electrically conductive, transparent coatings and said chamber receiving a liquid crystal layer, which can be switched between different optical states, the improvement comprising said device being a rear view mirror in a motor vehicle, said device having a reflective mirror layer in direct contact with one of the carrier plates and a circular polarizer being disposed in front of the other carrier plates to circularly polarize light entering the cell, said liquid crystal layer while in a rest state having a twisted homeogeneously orientation and with increasing voltages assumes a homeotropic orientation, and said device including a light sensitive element electrically connected to the transparent coatings of the light valve so that the liquid crystal layer is constantly changing its light transmittance in response to the intensity of the light radiation falling onto the light sensitive element.

* * * * *